UNITED STATES PATENT OFFICE.

CHRESTEN TORBEN MADSEN, OF OAKLAND, CALIFORNIA.

PLASTIC MATERIAL.

1,269,946.  Specification of Letters Patent.  Patented June 18, 1918.

No Drawing.  Application filed September 11, 1917.  Serial No. 190,857.

*To all whom it may concern:*

Be it known that I, CHRESTEN T. MADSEN, a citizen of the United States, residing at Oakland, in the county of Alameda and State of California, have invented new and useful Improvements in Plastic Materials, of which the following is a specification.

This invention relates to compositions for building materials and a process for producing same, and has for its object to produce a hard, tough composition of this sort which is impervious to moisture, comparatively light and inexpensive, and suitable for use as a plaster, mortar or as a plastic material to be molded into building blocks, etc. The composition has also been found very effective as a waterproof covering for roofs.

In carrying out the invention, a mortar composed of mineral constituents is mixed with fibrous materials in a finely divided condition, such as sawdust, shavings, etc., which have first been impregnated with certain vegetable oils and resinous substances.

The preferred way of making the composition is to prepare an impregnating liquid by boiling together in water, one part by volume, of resinous substances, preferably fir or pine needles, two parts plants having mucilaginous qualities, preferably mallows, and four parts terebic wood, such as eucalyptus gum tree leaves or bark. The preparation of this liquid could be varied in several ways, such as by substituting a suitable amount of resin for the pine or fir leaves. The fibrous material to be used is thoroughly soaked in the liquid thus prepared and then dried to permit all the ingredients of the composition to be mixed while dry and thus facilitate transportation before use. The composition is completed by adding to four parts of prepared fibrous material, four parts of slaked lime, four parts hydraulic cement and two parts coarse sand. These substances are thoroughly mixed with sufficient water to form a plastic mass of the desired consistency, which can then be molded into suitable shapes or used as a plaster.

When dry, the composition has comparatively little weight and yet is exceedingly hard, tough and impervious to moisture. The treated fibrous material serves, of course, to provide bulk with little weight but, because of its special preparation, it has additional functions as well. The mucilaginous properties produced by the preparation assist in giving cohesion while the resinous substances harden the composition and, together with the oily materials, make the sawdust impervious to moisture and thus prevent its swelling when exposed to the weather.

Having thus described my invention, what I claim and desire to secure by Letters Patent is—

1. A process of making a composition of the character described, which consists in impregnating fibrous materials with a liquid having resinuos, mucilaginous and terebic constituents, and mixing said impregnated fibrous material with a mineral cement.

2. A process of making a composition of the character described, which consists in impregnating fibrous materials with a liquid having resinous, mucilaginous, and terebic constituents, and mixing said impregnated fibrous material with a mineral cement.

3. A process of making a composition of the character described, which consists in impregnating fibrous materials with a liquid having resinous, mucilaginous, and terebic constituents, and mixing four parts of said impregnated fibrous material with four parts sand, four parts cement, and two parts slaked lime.

4. A composition of matter composed of cement into which a comminuted fibrous material is mixed, said material having been treated in a liquid having resinous and mucilaginous constituents, to which are added a terebic element and a proportion of sand.

5. A composition of matter composed of four parts cement, four parts slaked lime, two parts sand, and four parts sawdust, said sawdust having been treated in a liquid made by boiling two parts mucilaginous plants, one part resinous substances, and four parts terebic wood in water.

6. A composition of matter composed of four parts cement, four parts slaked lime, two parts sand, and four parts sawdust, said sawdust having been treated in a liquid made by boiling two parts mallows, one part fir needles, and four parts eucalyptus gum leaves and bark, in water.

In testimony whereof I have hereunto set my hand in the presence of two subscribing witnesses.

CHRESTEN TORBEN MADSEN.

Witnesses:
JOHN H. HERRING,
W. W. HEALEY.

Copies of this patent may be obtained for five cents each, by addressing the "Commissioner of Patents, Washington, D. C."